United States Patent Office 3,438,804
Patented Apr. 15, 1969

3,438,804
WATER ABSORBENT MATERIAL RENDERED WATER REPELLENT WITH POLYISOBUTENYLSUCCINIC ANHYDRIDE
Jerry E. Berger, Edwardsville, Ill., assignor to Shell Oil Company, New York, N.Y., a corporation of Delaware
No Drawing. Filed Oct. 21, 1965, Ser. No. 500,279
Int. Cl. C03c 25/02; C09d 5/00
U.S. Cl. 117—123　　　　　　　　　　　　　　4 Claims

ABSTRACT OF THE DISCLOSURE

A water repellent material is prepared by treating a normally water-absorbent material such as cellulosic and masonry materials with a dilute inert hydrocarbon solution of polyisobutenylsuccinic anhydride and drying said materials to provide a hydrophobic film thereon.

---

This invention relates to a process for obtaining water repellent materials.

Specifically, the invention provides a simple and economical process for providing water repellent cellulosic and masonry materials, such as water repellent paper, wood, cloth, corrugated board and concrete materials. The process consists of establishing a hydrophobic film derived from polyisobutenylsuccinic anhydride on the surface of these materials.

Water-proofing and water repellent agents are well-known. Many of these agents, however, are unsuitable for certain applications due to their cost per se or the cost involved in treating materials with such agents. For example, in manufacturing corrugated board or paper, large quantities of these materials are kept on hand at the manufacturing site, and accordingly the materials often come into contact with moisture during manufacturing, storage or handling thereof. Water repellent treatment cost considerations are also important in other areas, such as protection of concrete highways and bridges against freeze-thaw stresses which cause spalling and protection of wooden structures against weathering, where large quantities of the water repellent agents are required and a simple and economical application of the agents is desirable. It would be desirable, therefore, to provide a simple and economical means of effectively imparting water repellency to absorbent materials wherein the cost of the water repellent treatment, including cost of agent and application thereof, does not outweight the utility of performing the treatment.

Accordingly, it is an object of the present invention to provide a means of treating water-absorbent materials to make them water repellent. It is a further object of the invention to provide a means therefor which is simple and economical in its application.

It has now been found that these and other objects are accomplished by the process of the present invention which comprises treating materials which are normally water-absorbent with a solution consisting of polyisobutenylsuccinic anhydride dissolved in an inert solvent and then volatilizing the solvent or drying to establish a hydrophobic film derived from polyisobutenylsuccinic anhydride on the surface of the materials.

After the solvent volatilizes, the resulting dry hydrophobic film derived from polyisobutenylsuccinic anhydride is firmly established on the surface of the treated material, and at the same time, the treated material retains its original permeability to vapor and gases. This hydrophobic film is effective in water repellence, but should not be regarded as permanent. The water repellent treatment of this invention is particularly effective in the treatment of cellulosic and masonry materials. While it is not desired to suggest with certainty any specific mechanisms which explains the establishment of the film to the surface of the material, it is thought that the anhydride moieties in polyisobutenylsuccinic anhydride react with hydroxyl groups in the materials to form tenaciously bound films thereto.

The water repellent ingredient of the above-described solution is polyisobutenylsuccinic anhydride. The compound is the reaction product of polyisobutylene and maleic anhydride and has a weight average molecular weight of from about 900 to 1300 and preferably from 900 to 1100.

The adduct is suitably prepared by reacting equal molar proportions of polyisobutylene having a molecular weight of about 800 to 1200 and maleic anhydride in a nitrogen atmosphere at 190–210° C. If desired, the reaction may be carried out in the presence of a solvent, such as an aromatic hydrocarbon or a mixture of aromatic and paraffinic hydrocarbons, for example, toluene or xylene.

Suitable solvents for the polyisobutenylsuccinic anhydride include any substance which is inert therewith and is capable of volatilizing either with or without the application of heat. Generally, hydrocarbon and petroleum solvents may be used such as alkanes, alkenes, aromatic compounds, cyclic compounds, petroleum fractions, etc., for example, hexane, gasoline, kerosene, naphtha, and the like, although other solvents are not excluded. Therefore, in selecting a particular solvent, consideration should be given to the cost, toxicity, flammability, etc., of the solvent with respect to the particular application of the water repellent solution including materials to be treated, means of applying the treatment, area in which the treatment is to be applied, e.g., whether within a confined area indoors or whether outdoors. Accordingly, the selection of particular solvent is one of choice and may involve consideration of the circumstance, including those mentioned above before the most appropriate solvent can be selected.

According to one modification of the invention, it may be desirable to add water to the solution to form an emulsion to facilitate adaption to existing manufacturing methods, avoid fire hazards, and possibly reduce costs. For example, the cost of application of polyisobutenylsuccinic anhydride to concrete can be reduced by spraying with polyisobutenylsuccinic anhydride-containing-water-in-hexane emulsions. After the water and hexane evaporated, the concrete is hydrophobic.

The concentration of polyisobutenylsuccinic anhydride in solution may vary over a wide range. For example, a concentration of 1 to 20% by weight or higher may be used. In certain cases it may be desirable to employ as high a concentration of the anhydride as possible since in many instances the cost of solvent will be greater than the cost of the anhydride. A limiting factor which controls the concentration of the solute, however, is the solubility thereof in the solvent and also the effect of the higher concentrations upon application results desired.

Generally, the concentration of anhydride will range from about 1% to 10%, and usually a range of from about 1% to 4% is suitable.

Treatment of the cellulosic or masonry materials with the solution is easily accomplished. The solution is applied to the material by any suitable means, such as brushing or spraying the solution onto the material, or the material may be immersed in the solution. After treating the material with the solution, for example by spraying the surface of the material with the solution, the material is dried, i.e., the solvent is volatilized either with or without the application of heat as desired or as the circumstances dictate. The resulting dried material has established or bound thereto a hydrophobic film derived from polyisobutenylsuccinic anhydride. Materials treated according to the process of this invention retain their original permeability to vapors and gases, but are water repellent as illustrated by the examples to follow.

An important characteristic of the hydophobic film formed according to the process of the present invention is its resistance to biodegradation. This resistance appears to result from the presence of a highly branched structure formed by the polymerization of isobutylene.

To illustrate the manner in which the invention may be carried out, the following examples are given. It is to be understood that the examples are for the purpose of illustration and the invention is not to be regarded as limited to any specific embodiment recited therein. Unless otherwise specified, concentration expressed in percent has reference to percent by weight, and the expression PBSA as used in the examples has reference to polyisobutenyl-succinic anhydride.

Example I

This example illustrates the water repellency of paper and canvas treated with varying concentrations of PBSA (molecular weight 1200) in hexane.

Clean canvas and Whatman No. 2 Filter Paper are immersed in hexane solutions of PBSA for one minute. The test specimens are dried and clamped in a holder and inclined at an angle of 45° from horizontal. Water droplets from a 250 ml. reservoir are sprayed on the specimens and the gain in weight is measured. These results are given in Table 1-A.

TABLE 1-A.—CANVAS AND PAPER

| PBSA concentration in hexane, percent | Percent weight gained | |
|---|---|---|
| | Canvas | Filter paper |
| 0 | 57.0 | 64 |
| 1 | 3.7 | 8 |
| 2 | 3.4 | 8 |
| 4 | 2.3 | 8 |

The above experiment is repeated except that the specimens are soaked in water for 5 minutes instead of spraying the specimens with water. The results are given in Table 1-B.

TABLE 1-B.—CANVAS AND PAPER

| PBSA concentration in hexane, percent | Percent weight gained | |
|---|---|---|
| | Canvas | Filter paper |
| 0 | 136 | 117 |
| 1 | 94 | 44 |
| 2 | 86 | 42 |
| 4 | 71 | 43 |

Example 2

This example illustrates the water repellency of box board treated with varying concentrations of PBSA (molecular weight 1200) in hexane.

Box board panels are immersed in hexane solutions of PBSA for one minute and dried at 100° C. for 30 minutes. The dried panels are inclined at an angle of 45° from horizontal and sprayed with water droplets. The results are given in Table 2.

TABLE 2.—BOX BOARD

| PBSA concentration in hexane, percent | Percent weight gained due to water absorption |
|---|---|
| 0 | 22.0 |
| 1 | 1.5 |
| 2 | 1.0 |
| 4 | 1.0 |

The box board retained its original permeability to vapor and gases after treatment with the PBSA solutions.

Example 3

This example illustrates the water repellency of concrete treated with varying concentrations of PBSA (molecular weight 1000 to 1200) in hexane.

Concrete disc-shaped samples are immersed in hexane solutions of PBSA for 30 minutes and then dried for thirty minutes at 200° F. The dried samples were then immersed in water and the weight gain of the samples and the contact angle of water drops formed on the surface of the concrete were measured. The results are given in Table 3.

TABLE 3.—CONCRETE

| PBSA concentration in hexane | Contact angle (deg.) | Weight gained (percent) from water immersion | |
|---|---|---|---|
| | | 5 min. soak | 65 hr. soak |
| 0 | 0 | 7.3 | 9.4 |
| 1 | 45–65 | 0.7 | 7.5 |
| 2 | 80 | 0.3 | 9.0 |
| 4 | 85–90 | 0.0 | 1.2 |

Example 4

This example illustrates the water repellency of birch tongue depressors treated with varying concentrations of PBSA (molecular weight 1000 to 1200) in hexane.

The depressors are immersed in hexane solutions of PBSA and are withdrawn and dried at 77° F. (air dried) or 200° F. (oven dried). Water drops are placed on the surfaces and the water-drop contact angle is measured. The results are given in Table 4.

TABLE 4.—WOOD

| PBSA concentration in hexane | Immersion time | Contact angle, degrees | |
|---|---|---|---|
| | | Air dried | Oven dried |
| 0 | 15 min | 0 | 0 |
| 1 | 30 min | 105 | 105 |
| 4 | 15 min | 108 | 116 |
| 0 | 18 hr | 0 | |
| 1 | 18 hr | 105 | |
| 2 | 18 hr | 106 | |
| 4 | 18 hr | 108 | |
| 8 | 18 hr | 114 | |
| 16 | 18 hr | 116 | |

Example 5

This example illustrates the effects of weathering on the water repelling ability of PBSA. Spray treated canvas and concrete were subjected to outdoor storage for a seven-week period beginning in January. The effects of exposure on the test samples were monitored. Relatively heavy amounts of rain and snow fell during this period. The results of this experiment on canvas are given in Table 5.

TABLE 5.—CANVAS

| PBSA (mol wt. 1,000–1,200 concentration in hexane | Weight gain in spray test | | |
|---|---|---|---|
| | Initial | 3-wk. exposure | 7-wk. exposure |
| 0 | 2.76 g. (17%) | 3.30 g. (20%) | 9.44 g. (57%) |
| 1 | 0.21 g. (1.3%) | 0.60 g. (3.6%) | 1.64 g. (9.9%) |
| 2 | 0.18 g. (1.1%) | 0.57 g. (3.5%) | 1.25 g. (7.6%) |
| 4 | 0.18 g. (1.1%) | 0.55 g. (3.3%) | 0.86 g. (5.2%) |
| 6 | 0.19 g. (1.2%) | 0.36 g. (2.2%) | 0.65 g. (3.9%) |

The untreated canvas became much more absorbent; presumably repeated freezing and thawing produced a fluffy fabric.

The exposure tests on concrete were qualitative. At the end of the seven-week exposure period, concrete pavement sprayed with a 5% PBSA solution in hexane retained its hydrophobic nature.

In the foregoing examples hexane was selected as the solvent. Similar results are also obtained when other solvents, such as gasoline, kerosene, and the like, are used in place of hexane. As explained hereinbefore, the solvent does not affect the formation or establishment of the hydrophobic film on the surface of the treated material so long as the solvent is inert with respect to PBSA and is volatile. The solvent merely serves as a vehicle for the PBSA.

The above examples demonstrate the simplicity of preparing the PBSA solutions and application thereof. More-over, the water repellent treatment of the present invention is economical and effective for commercial and non-commercial applications, such as an anti-spalling treatment of concrete pavements, weathering protection for lawn furniture, fiber-board building materials, cardboard carton, cloth, temporary wood scaffolding, etc.

I claim as my invention:

1. A water repellent material comprising (1) a normally water-absorbent material and (2) a coating thereon consisting of polyisobutenylsuccinic anhydride.

2. A water repellent material as in claim 1 wherein the polyisobutenylsuccinic anhydride has a molecular weight from about 90 to 1300.

3. A water repellent material as in claim 1 wherein the normally water-absorbent material is selected from the group consisting of cellulosic and masonry materials.

4. A water repellent material as in claim 3 wherein the cellulosic material is wood.

References Cited
UNITED STATES PATENTS 3,202,679   8/1965   Andrewsen et al. _____ 8—78.4 X WILLIAM D. MARTIN, *Primary Examiner.*

T. G. DAVIS, *Assistant Examiner.*

U.S. Cl. X.R.

117—121, 135.5, 148, 155, 161